LEWIS GRISCOM.
Improvement in Steam Pumps.

No. 4,874. Reissued April 16, 1872.

Witnesses:
Wm. R. Wright
Thos. A. Burtt.

Inventor.
Lewis Griscom,
by his Atty,
Horace Binney, 3rd.

AM. PHOTO-LITHOGRAPHIC CO. N.Y. (OSBORNE'S PROCESS.)

UNITED STATES PATENT OFFICE.

LEWIS GRISCOM, OF PORT CARBON, PENNSYLVANIA, ASSIGNOR TO HIMSELF, CHALKLEY GRISCOM, AND JOHN P. GRISCOM, OF SAME PLACE.

IMPROVEMENT IN STEAM-PUMPS.

Specification forming part of Letters Patent No. 124,679, dated March 19, 1872; reissue No. 4,874, dated April 16, 1872.

SPECIFICATION.

*To all whom it may concern:*

Be it known that I, LEWIS GRISCOM, of Port Carbon, in the county of Schuylkill, State of Pennsylvania, have invented a new and useful Improvement in Crank Steam-Pumps; and I do hereby declare the following to be a full, clear, and exact description thereof, which will enable others skilled in the art to which it appertains to make and use my invention, reference being had to the accompanying drawing which forms part of this specification, and in which—

Figure 1:
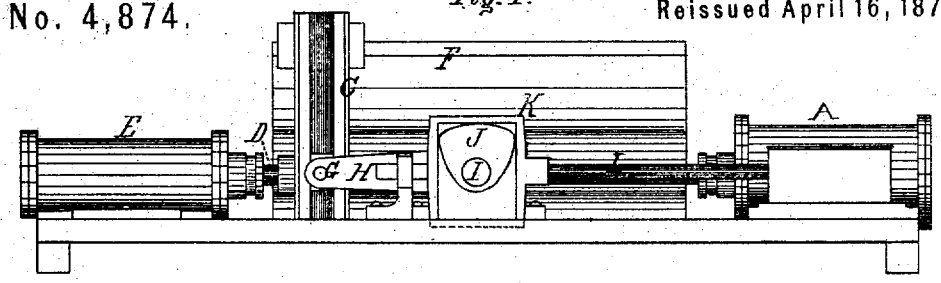
Figure 2:
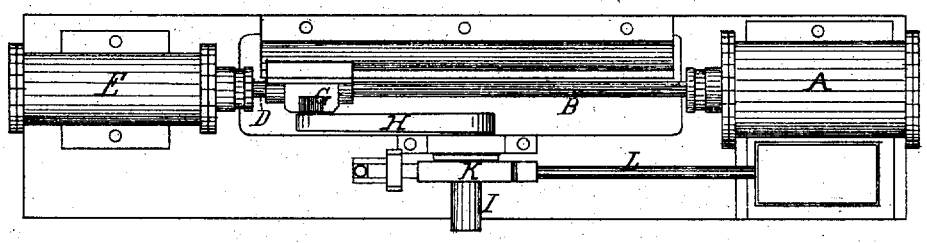
Figure 3:
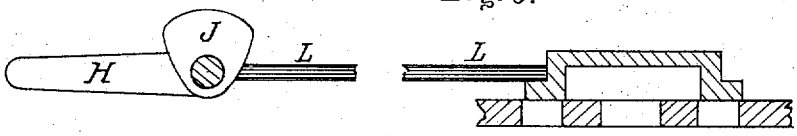
Figure 4:
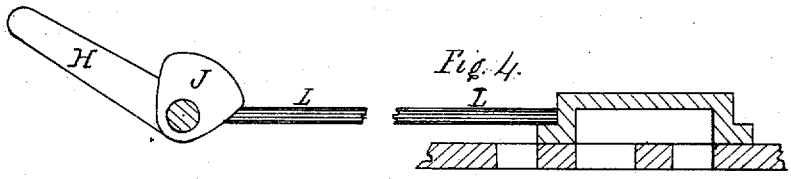
Figure 5:
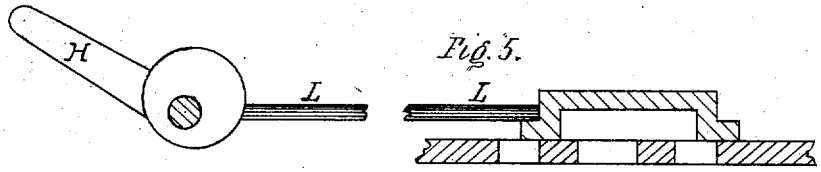

Figure 1 represents my invention in side elevation; Fig. 2 is a plan or top view thereof; and Figs. 3, 4, and 5 represent different positions of the valve.

The same parts are denoted by the same letters in all the figures.

This invention relates to that class of machinery known as crank steam-pumps, and in which motion is communicated to the stem of the valve which admits steam to the cylinder through the intervention of a revolving crank-shaft, on which is keyed the eccentric by whose rod the valve-stem is worked, the crank being rotated by the reciprocating movement of the piston-rod or pump-rod, to which it is connected by a slotted cross-head, connecting-rod, or equivalent device. The operation of such pumps has hitherto been attended with a serious difficulty, the nature of which will be understood by comparing them with ordinary steam-engines. In a steam-engine of the usual construction, as no rotating effect is produced when the crank is on the dead center, and very little until the crank-pin has passed some distance beyond the center, the steam must not be admitted too quickly at the beginning of the stroke, for in that case its force, instead of rotating the crank, would be thrown on the bed-plate and its connections. In a pump, on the other hand, where the power is exerted directly through the piston-rod and plunger to overcome the inertia of the whole mass of water at the beginning of the stroke, the full pressure of steam should be admitted as early as practicable. Hitherto this difference has not been recognized in the construction of crank steam-pumps. Their valve-stems being actuated by the ordinary eccentric, the full pressure of steam is not admitted as early as the conditions of their operation require, and the momentum of the fly-wheel and other revolving parts is consequently exerted against the water, resulting in a severe strain on the crank-pin and its bearings, as well as on the crank-shaft, cross-heads, connecting-rods, bed-plate, &c., sometimes breaking said shaft, dragging the crank-pins out of place, increasing the wear on their bearings, and invariably causing thumping and lost motion. To obviate this difficulty is the object of my invention; and it accordingly consists in the means hereinafter described, whereby the full pressure of steam is admitted sooner than can be done by the ordinary eccentric.

A, in the drawing, represents the steam-cylinder; B, the piston-rod; C, the cross-head; D, the pump-rod; E, the water-cylinder. F is the guide on which the cross-head C slides to and fro. The cross-head is grooved or slotted to receive the pin G of the crank-arm H attached to the shaft I. To this shaft I is secured the cam J, which I prefer to make of the form known as a D-cam, although various irregular forms may be employed. K is the frame within which the cam J revolves, and to which the valve-stem L is secured.

Fig. 3 represents the position of the cam when the crank is on the center, as shown in Fig. 1. This position is the same, whether the valve be worked by a cam or the ordinary eccentric. In Figs. 4 and 5 the crank has traveled about thirty-seven degrees from the center. In Fig. 4 is shown the operation of the cam, which has fully opened the steam-port, while in Fig. 5 the valve controlled by the ordinary eccentric has opened it only about half way. By thus using a cam of the form shown, or of any other well-known form, which will operate the valve-stem at the beginning of the stroke more rapidly than is done by the ordinary eccentric, the force of the steam is admitted at the earliest instant, and the revolving parts are relieved from the strain above described.

I have shown this invention as applied to a slide-valve, but it may evidently be applied to puppet or other valves, the cam-frame being connected therewith in the same manner as the ordinary eccentric strap. The details of construction may also be varied without departing substantially from the arrangement I have described.

What I claim as my invention, and desire to secure by Letters Patent of the United States, is—

1. In a steam-pump, the regulating-shaft I, cranks H, and cams J, operated by cross-head C or connecting-rods, substantially as described.

2. The arrangement, substantially as herein described, of the steam-cylinder A, water-cylinder E, piston-rod B, pump-rod D, grooved or slotted cross-head C, crank-pin G, crank H, crank-shaft I, cam J, and devices connected with said cam to actuate the valve.

LEWIS GRISCOM.

Witnesses:
T. C. CONNOLLY,
RICHARD COVINGTON.